United States Patent [19]
Kinoshita et al.

[11] Patent Number: 5,638,936
[45] Date of Patent: Jun. 17, 1997

[54] ONE-WAY CLUTCH

[75] Inventors: Yoshio Kinoshita; Toshio Awaji, both of Shizuoka-ken, Japan

[73] Assignee: NSK-Warner K.K., Tokyo, Japan

[21] Appl. No.: 426,721

[22] Filed: Apr. 21, 1995

[30] Foreign Application Priority Data

Apr. 21, 1994 [JP] Japan ................................. 6-120833
Jun. 1, 1994 [JP] Japan ................................. 6-154112

[51] Int. Cl.$^6$ .................................................. F16D 13/60
[52] U.S. Cl. ................................... 192/113.32; 192/41 R
[58] Field of Search ........................ 192/113.32, 45.1, 192/41 R, 41 A

[56] References Cited

U.S. PATENT DOCUMENTS

| | | | |
|---|---|---|---|
| 4,782,931 | 11/1988 | Lederman | 192/113.32 X |
| 4,913,271 | 4/1990 | Kinoshita et al. | 192/113.32 X |
| 4,961,486 | 10/1990 | Kinoshita et al. | 192/113.32 X |
| 5,156,245 | 10/1992 | Fujiwara et al. | 192/45.1 X |

FOREIGN PATENT DOCUMENTS 2-163558  6/1990  Japan.

*Primary Examiner*—Charles A. Marmor
*Assistant Examiner*—Saul J. Rodriguez
*Attorney, Agent, or Firm*—Evenson, McKeown, Edwards & Lenahan, P.L.L.C.

[57] ABSTRACT

A one-way clutch has an inner ring, an outer ring concentrically arranged in relation to the inner ring with an annular space defined therebetween, a clutch mechanism disposed in the annular space, and an end bearing disposed adjacent one of opposite ends of the clutch mechanism as viewed in the direction of a central axis of the inner ring so that the end bearing serves to guide the clutch mechanism. An end plate is arranged on a side of an outer wall of the end bearing. The end plate comprises a substantially ring-shaped thin plate and is fixed with a radially outer circumferential portion thereof maintained in close contact with an end face of the outer ring or the outer wall of the end bearing. A radially inner periphery of the end plate extends approximately to or beyond an area of sliding contact between the end bearing and the inner ring, whereby an oil-collecting pocket having an opening is defined between the end plate and the end bearing or an end face of the inner ring. A lube oil scattered under centrifugal force from a side of the inner ring is caught through the opening and is collected in the oil-collecting pocket.

13 Claims, 6 Drawing Sheets

ONE-WAY CLUTCH

BACKGROUND OF THE INVENTION a) Field of the Invention

This invention relates to a one-way clutch which is employed as a component for transmitting a torque, preventing reverse rotation or like purposes in a drive mechanism of an automotive vehicle or the like.

b) Description of the Related Art

One-way clutches are widely used as automobile components. In a one-way clutch, an inner ring and an outer ring repeatedly undergo relative sliding motion due to engagement between and idling of the inner and outer rings. Substantial heat generation and friction therefore occur unless sufficient lubrication is applied. Further, it is also necessary to feed a lube oil sufficiently to the one-way clutch to avoid irregular rotation and/or seizure of one or more end bearings employed in the one-way clutch.

The construction of a conventional one-way clutch will first be described with reference to FIG. 2, which illustrates an inner ring 10, an outer ring 20, a one-way clutch 30, end bearings 40 arranged on opposite sides of the one-way clutch, a stop ring 60 for holding the one-way clutch in place, a spacer 75 for regulating the position of the one-way clutch 30 in an axial direction, and a central axis 90 of rotation of the entire mechanism.

A lube oil delivered from a lube oil pump (not shown) is caused to flow and scatter to the periphery of the one-way clutch 30 as indicated by arrow S.

In a conventional one-way clutch of the above-described type, introduction of a lube oil into the one-way clutch is not expected to achieve substantial distribution of the lube oil within the one-way clutch where an inner ring is fixed, although the lube oil is surely and fully distributed inside the one-way clutch under centrifugal lubricating action where the inner ring rotates. Unless the inner ring rotates, it is therefore necessary to increase the capacity of a lube oil pump as a supply source for the lube oil. An increase in the supply of the lube oil, however, leads to greater agitation resistance and viscous resistance due to the lube oil remaining in a larger amount around the one-way clutch, resulting in a greater power loss.

With a view toward feeding the lube oil, which has scattered to the periphery of the one-way clutch, into the one-way clutch to assure supply of the lube oil in a sufficient amount to the interior of the one-way clutch, it has accordingly been proposed to provide an inner circumferential wall of each end bearing with a helical oil groove so that, under relative rotation between the end bearing and the inner or outer ring, pumping action is developed to guide the lube oil, which has scattered to the periphery of the one-way clutch, to the interior of the one-way clutch.

FIG. 1A is a front view of such an end bearing 40. It is to be noted that only the left-hand half of the end bearing 40 is shown in FIG. 1A. FIG. 1B is a side view of the end bearing 40 as viewed in the direction of arrow IB in FIG. 1A. These drawings shown an example in which an inner circumferential wall 121 is provided with a helical oil groove 123. Numeral 124 indicates an opening of the helical oil groove 123, whereas numeral 122 designates an outer peripheral wall of the end bearing 40. Further, FIG. 1C illustrates a modification of the end bearing 40, in which an oil hole 125 is formed to allow the lube oil to flow in to a side of a clutch mechanism.

To allow the helical oil groove 123 to effectively exhibit pumping action, however, the lube oil which has scattered around has to be efficiently collected to or around the inner circumferential wall of the end bearing 40.

SUMMARY OF THE INVENTION

To overcome the above-described problem of the conventional art, the present invention provides a one-way clutch having an inner ring, an outer ring concentrically arranged in relation to the inner ring with an annular space defined therebetween, a clutch mechanism disposed in the annular space, and an end bearing disposed adjacent one of opposite ends of the clutch mechanism as viewed in the direction of a central axis of the inner ring so that the end bearing serves to guide the clutch mechanism. An end plate is arranged on a side of an outer wall of the end bearing, said outer wall being opposite to an inner wall of the end plate located on a side of the clutch mechanism. The end plate comprises a substantially ring-shaped thin plate and is fixed with a radially outer circumferential portion thereof maintained in close contact with an end face of the outer ring or the outer wall of the end bearing. A radially inner periphery of the end plate extends approximately to or beyond an area of sliding contact between the end bearing and the inner ring, whereby an oil-collecting pocket having an opening is defined between the end plate and the end bearing or an end face of the inner ring. A lube oil scattered under centrifugal force from a side of the inner ring is caught through the opening and is collected in the oil-collecting pocket.

In another embodiment, an additional end bearing can be disposed adjacent the other end of the clutch mechanism. In a further embodiment, an additional end plate can be arranged on a side of an outer wall of the additional end bearing.

In a preferred embodiment, each end bearing can be provided with a helical oil groove formed in a wall thereof where the end bearing is maintained in sliding contact with the inner or outer ring, whereby the lube oil is guided by the helical oil groove.

Owing to the construction described above, the one-way clutch according to the present invention can surely collect the scattered lube oil and efficiently guide it to the interior of the one-way clutch so that the one-way clutch can be sufficiently lubricated.

DETAILED DESCRIPTION OF THE INVENTION AND PREFERRED EMBODIMENTS

Figure 3A:
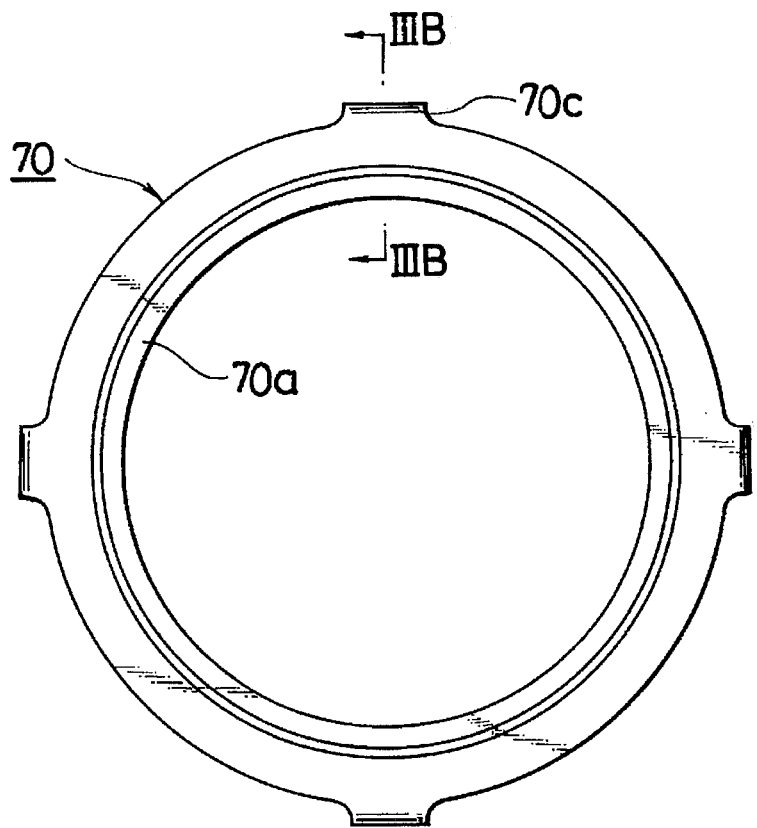
FIG. 3 is a front view of an end plate useful in the practice the present invention.
FIG. 3B is a cross-sectional view of the end plate taken in the direction of arrow IIIB in FIG. 3A.
Figure 3B:
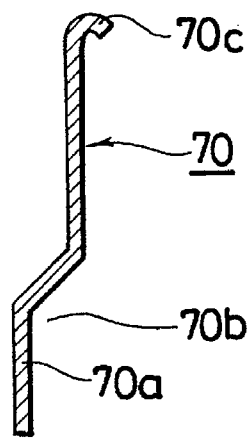

Referring first to FIGS. 3A and 3B, the end plate useful in the practice of the present invention is generally designated at numeral 70. An inner periphery of the end plate 70 is inwardly extended to form an extension 70a. When assembled in a one-way clutch, a pocket is formed on an inner side of the extension 70a, that is, between the extension 70a and an associated end bearing. This pocket serves as an oil collecting portion 70b. Designated at symbol 70c is a portion at which the end plate 70 is crimped on an outer ring.

Figure 2:
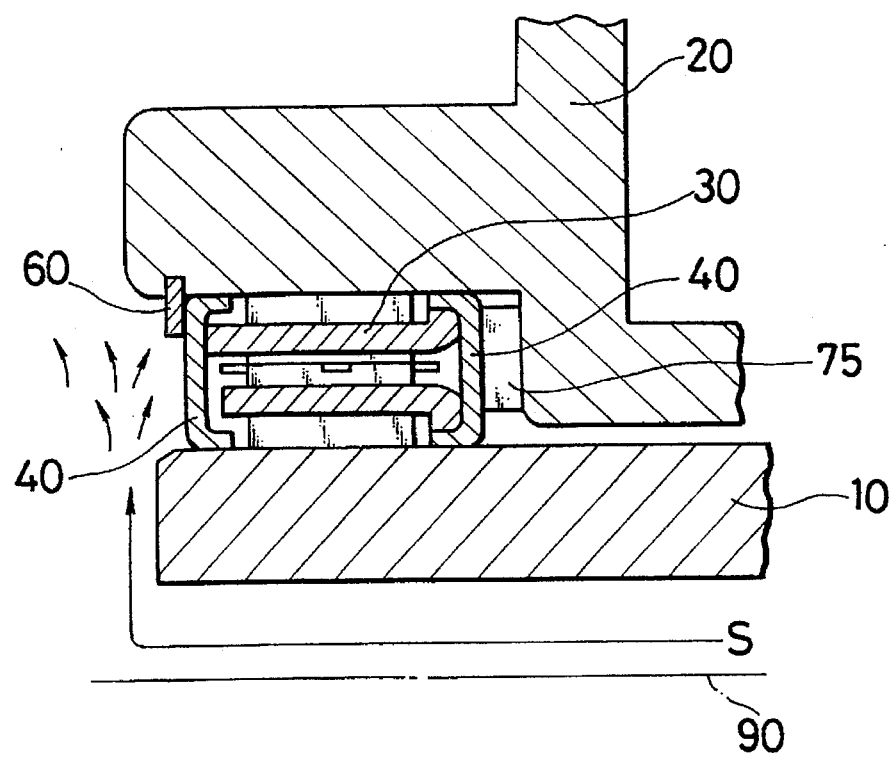
FIG. 2 is a fragmentary cross-sectional view of a conventional one-Way clutch.
Figure 4:
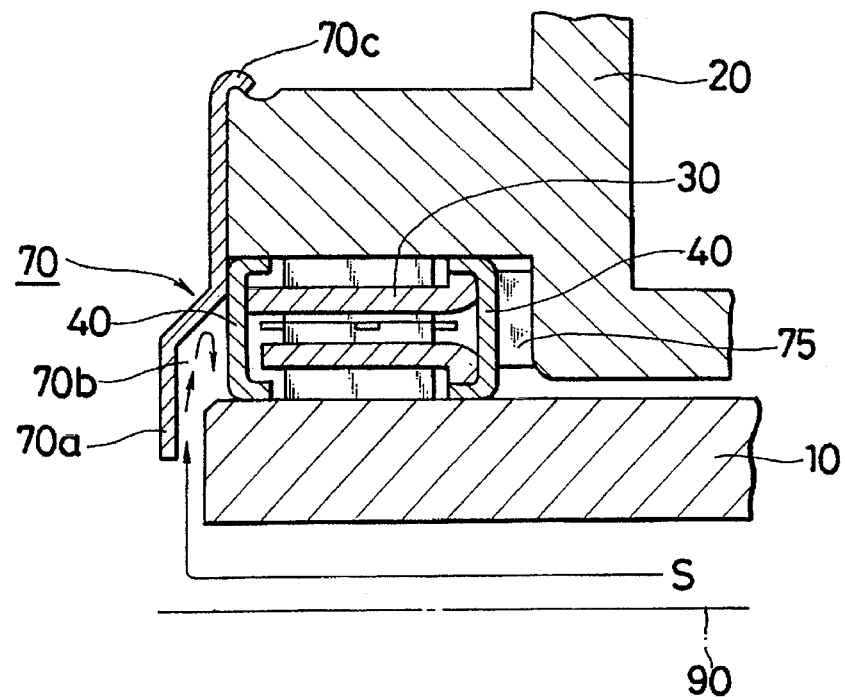
FIG. 4 is a fragmentary cross-sectional view of a one-way clutch according to a first embodiment of the present invention.

FIG. 4 illustrates the first embodiment of the present invention. The one-way clutch according to the first embodiment is similar to the conventional one-way clutch shown in FIG. 2 as far as the inner ring 10, the outer ring 20, the one-way clutch mechanism 30, the end bearings 40, the spacer 75 and the central axis 90 of rotation are concerned. In the illustrated embodiment, an end plate 70 also serves as a holding plate for the associated end bearing 40 and is crimped at a crimp portion 70c on the outer ring 20. The clutch mechanism 30 can be a conventionally known clutch mechanism and, as illustrated in the drawing, comprises lock members such as sprags, a retainer and a leaf spring.

As described above with reference to FIG. 3B, an extension 70a of the end plate 70 extends in a direction away from the associated end bearing 40 so that an oil collecting portion 70b is formed between the extension 70a and the associated end bearing 40. Accordingly, the scattered lube oil which has reached the periphery of the end bearing 40 as indicated by arrow S is collected in the oil collecting portion 70b.

Figure 1A:
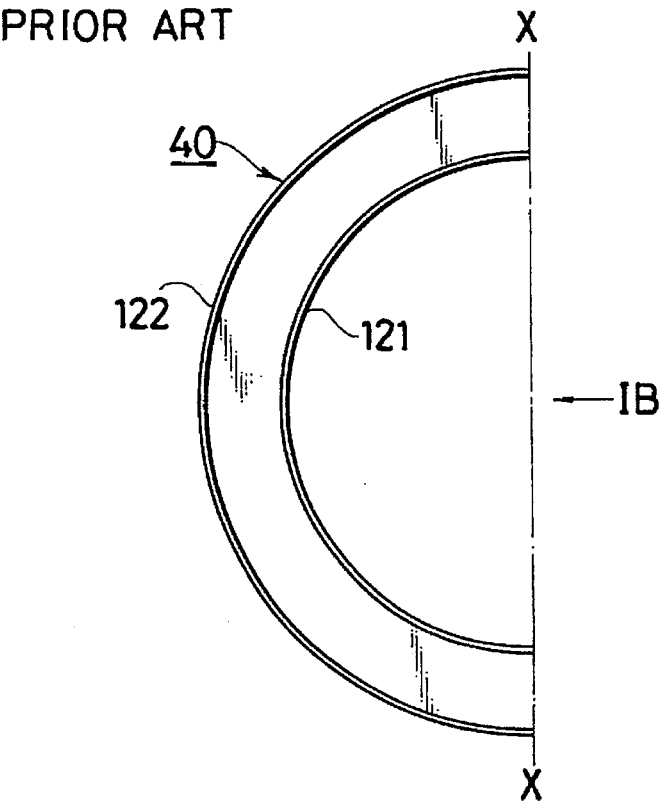
FIG. 1A is a front view of a conventional end bearing.
Figure 1B:
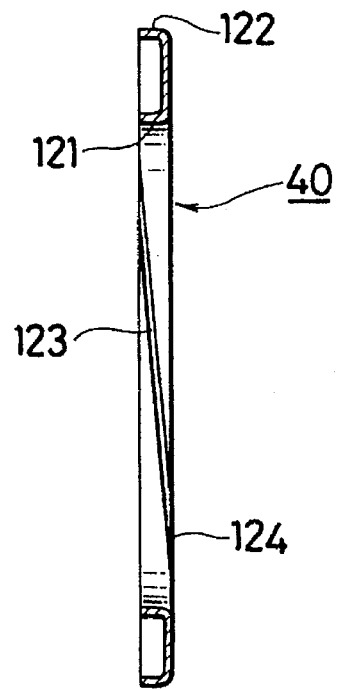
FIG. 1B is a side view of the conventional end bearing as viewed in the direction of arrow IB in FIG. 1A.

The formation of the oil collecting portion 70b is effective for guiding the lube oil to the clutch mechanism 30 even if the inner and outer circumferential walls of the associated end bearing 40 are smooth. Provision of helical oil grooves as in FIG. 1B is still more effective for the introduction of the lube oil into the clutch mechanism 30 since the lube oil collected in the oil collecting portion 70b can be efficiently introduced to the interior of the clutch mechanism 30 through the opening 124 (see FIG. 1B).

Figure 1C:
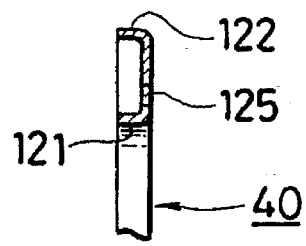
FIG. 1C is a fragmentary side view of a modification of the conventional end bearing, in which an oil hole is formed to permit flow of a lube oil therethrough.

The end plate 70 may be provided with an oil hole as shown at numeral 125 in FIG. 1C.

Figure 5:
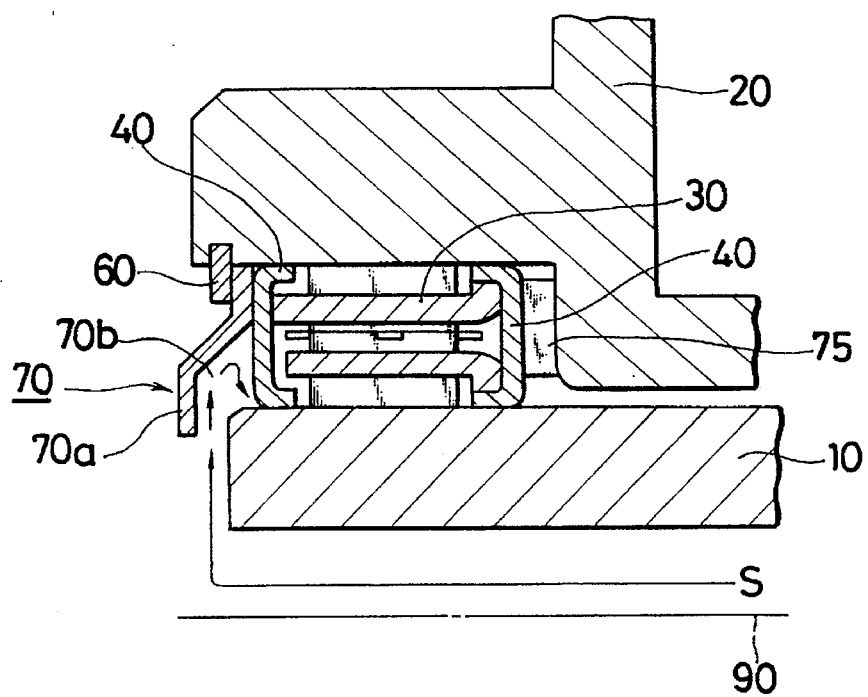
FIG. 5 is a fragmentary cross-sectional view of a one-way clutch according to a second embodiment of the present invention.

FIG. 5 illustrates the second embodiment, in which an end plate 70 is held in place on an outer wall of the associated end bearing 40 by means of a stopper ring 60. The other numerals indicate the corresponding elements of structure shown in FIGS. 2 and 4.

Figure 6:
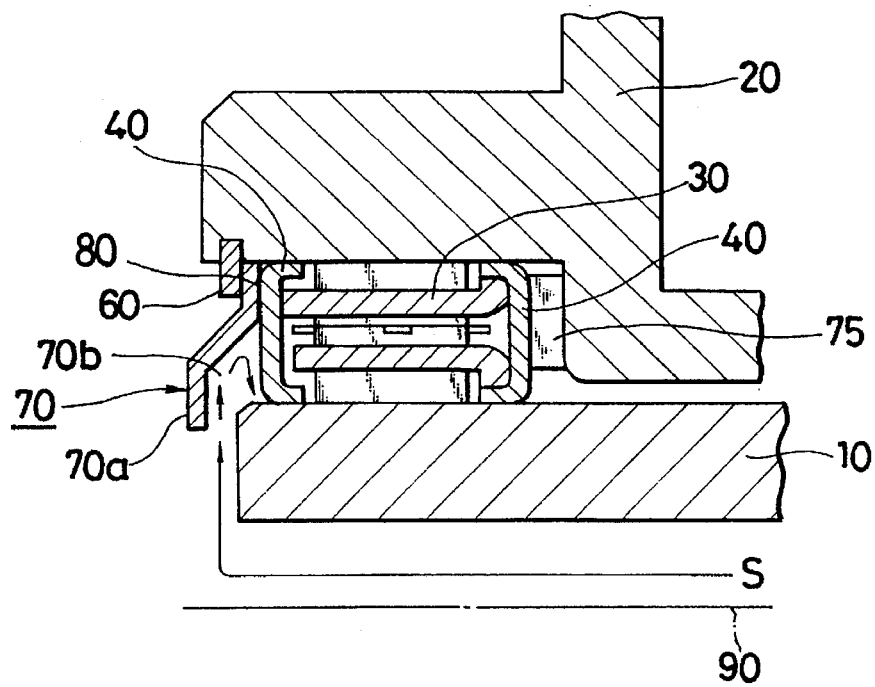
FIG. 6 is a fragmentary cross-sectional view of a one-way clutch according to a third embodiment of the present invention and FIGS. 7 and 7A are fragmentary cross-sectional views of a one-way clutch according to fourth and fifth embodiments of the present invention; respectively.

FIG. 6 depicts the third embodiment, in which a seal 80 is interposed between an end plate 70 and the associated end bearing 40 to prevent leakage of the lube oil through a space, if any, between the end plate 70 and the associated end bearing 40. This seal 80 can be formed of an adhesive or the like so that the end plate 70 and the associated end bearing 40 can be bonded together. Use of the adhesive or the like can improve the efficiency of the assembly work. As an alternative, the end plate 70 and the associated end bearing 40 can be directly joined together for the same purpose.

Figure 7:
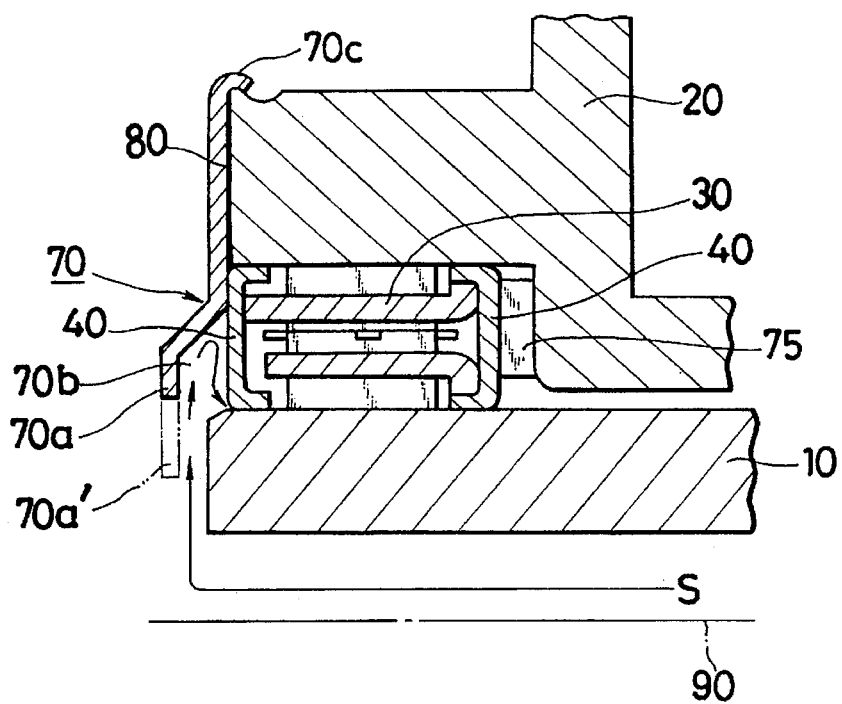

FIG. 7 shows the fourth embodiment, in which an end plate 70 also serving as a holding plate is crimped on the outer ring 20. A seal 80 is interposed between the end plate 70 and the opposing end face of the outer ring 20. This seal is formed of an adhesive or the like so that the assembly of the end plate 70 on the outer ring 20 was achieved with ease. As an alternative, the end plate 70 and the opposing end face of the outer ring 20 can be directly joined together.

No particular limitation is imposed on the position of an inner extremity (in other words, an inner periphery) of the end plate 70 as long as it is located near an area of sliding contact between the end bearing 40 and the inner ring 10, whereby the lube oil scattered around under centrifugal force and the like can be collected. The position of the inner extremity of the end plate 70 can be chosen as needed, for example, at a relatively higher position as indicated by symbol 70a in FIG. 7 or at a relatively lower position as indicated by symbol 70a' in the same drawing.

It is to be borne in mind that the present invention is not limited to the above-described embodiments but various changes or modifications are feasible without departing from the spirit of the present invention as defined in the claims.

Figure 7A:
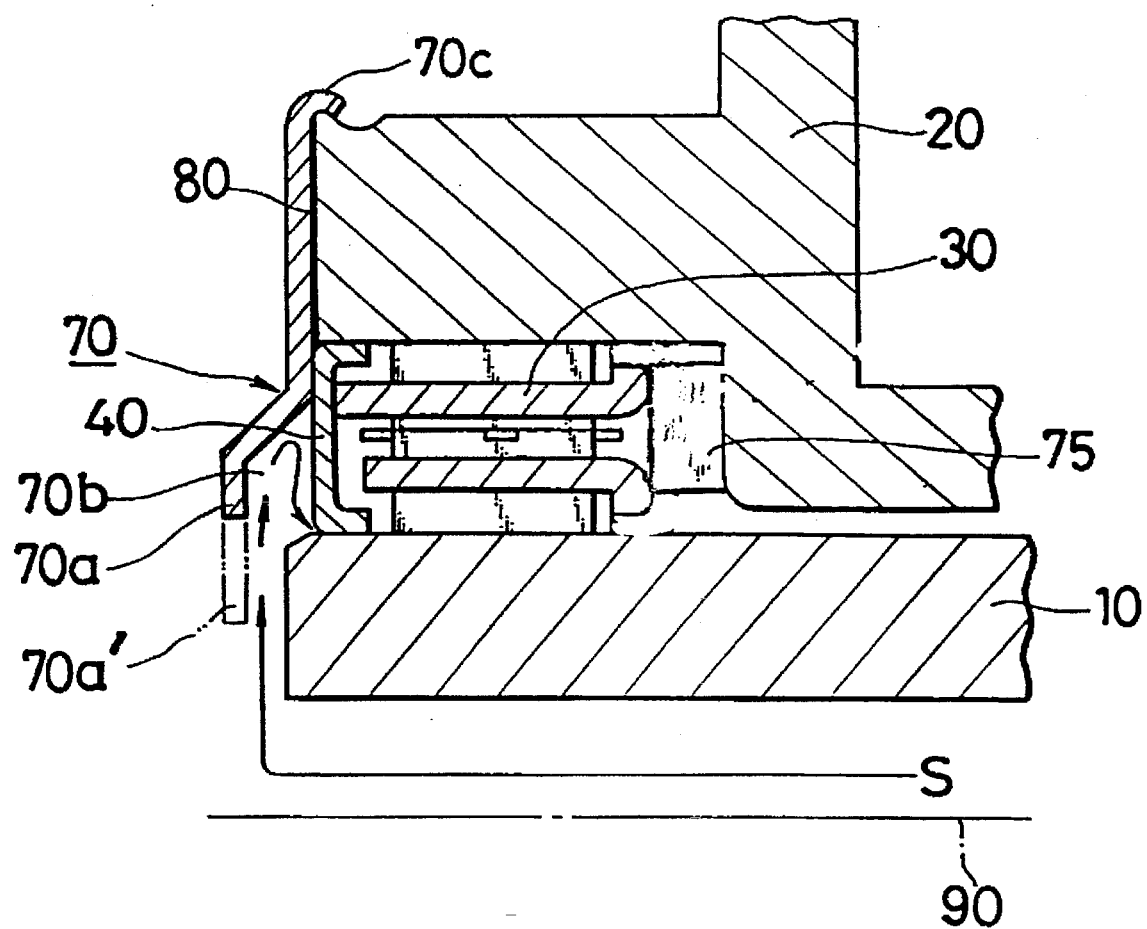

For example, referring to FIG. 7A one of the opposite end bearings 40 can be omitted depending on the mounting structure of the clutch mechanism 30 although the two end bearings 40 are arranged adjacent the opposite ends of the clutch mechanism 30 in the first to fourth embodiments of the present invention. Further, the end plate 70 is disposed on the side of only one of the opposite end bearings 40 in the first to fourth embodiments. An additional end plate can also be arranged on the side of the other end bearing 40. Referring, for example, to FIG. 7, the outer ring 20 in this modification has a substantially symmetrical structure with respect to a central axis of the clutch mechanism 30, which central axis extends at a right angle relative to the central axis 90 of rotation. These modifications can also bring about advantages similar to those available from the first to fourth embodiments.

What is claimed is:

1. In a one-way clutch having an inner ring, an outer ring concentrically arranged in relation to the inner ring with an annular space defined therebetween, a clutch mechanism disposed in the annular space, and an end bearing disposed adjacent one of opposite ends of the clutch mechanism as viewed in the direction of a central axis of the inner ring so that the end bearing serves to guide the clutch mechanism, the improvement wherein:

an end plate is arranged on a side of an outer wall of the end bearing, said outer wall being opposite to an inner wall of the end plate located on a side of the clutch mechanism, the end plate comprises a substantially ring-shaped thin plate and is fixed with a radially outer circumferential portion thereof maintained in close contact with an end face of the outer ring or the outer wall of the end bearing, and a radially inner periphery of the end plate extends approximately to one of an area of sliding contact between the end bearing and the inner ring and beyond said area, whereby an oil-collecting pocket having an opening is defined between the end plate and one of the end bearing and an end face of the inner ring;

wherein the end face of the inner ring is axially located between the end bearing and the end plate, and wherein the end bearing is provided with a helical oil groove formed in a wall thereof where the end bearing is maintained in sliding contact with the inner or outer ring, whereby a lube oil scattered under centrifugal force from a side of the inner ring is caught through the opening and is collected in the oil-collecting pocket and is guided by the helical oil groove into the clutch mechanism.

2. A one-way clutch according to claim 1, wherein the end bearing is provided with an oil hole through which the lube oil is allowed to flow in to a side of the clutch mechanism.

3. A one-way clutch according to claim 1, wherein the end plate forming the oil-collecting pocket, which serves to collect the lube oil, comprises an end-bearing-holding plate maintained in engagement with the outer ring.

4. A one-way clutch according to claim 1, further comprising a seal interposed between the end plate and one of the end bearing and the outer ring to prevent the lube oil from leaking out of the oil-collecting pocket through a space, if any, between the end plate and the respective end bearing and the outer ring.

5. A one-way clutch according to claim 1, wherein the end plate and one of the end bearing and the outer ring are directly joined together to prevent the lube oil from leaking out of the oil-collecting pocket through a space, if any, between the end plate and the respective end bearing and outer ring.

6. A one-way clutch according to claim 1, further comprising a stop ring fixed on an inner circumferential wall of the outer ring with the radially outer circumferential portion of the end plate fixedly interposed between the stop ring and the outer wall of the end bearing.

7. In a one-way clutch having an inner ring, an outer ring concentrically arranged in relation to the inner ring with an annular space defined therebetween, a clutch mechanism disposed in the annular space, and end bearings disposed adjacent opposite ends of the clutch mechanism, respectively, as viewed in the direction of a central axis of the inner ring so that the end bearings serve to guide the clutch mechanism, the improvement wherein:

an end plate is arranged on a side of an outer wall of one of the end bearings, said outer wall being opposite to an inner wall of the end plate located on a side of the clutch mechanism, the end plate comprises a substantially ring-shaped thin plate and is fixed with a radially outer circumferential portion thereof maintained in close contact with a corresponding end face of the outer ring or the outer wall of said one end bearing, and a radially inner periphery of the end plate extends approximately to one of an area of sliding contact between said one end bearing and the inner ring and beyond said area, whereby an oil-collecting pocket having an opening is defined between the end plate and a respective one of said one end bearing and a corresponding end face of the inner ring;

wherein the end face of the inner ring is axially located between the one end bearing and the end plate, and wherein each of the end bearings is provided with a helical oil groove formed in a wall thereof where the end bearing is maintained in sliding contact with the inner or outer ring, whereby a lube oil scattered under centrifugal force from a side of the inner ring is caught through the opening and is collected in the oil-collecting pocket and is guided by the helical oil groove into the clutch mechanism.

8. A one-way clutch according to claim 7, wherein each of the end bearings is provided with an oil hole through which the lube oil is allowed to flow in to a side of the clutch mechanism.

9. A one-way clutch according to claim 7, wherein the end plate forming the oil-collecting pocket, which serves to collect the lube oil, comprises an end-bearing-holding plate maintained in engagement with the outer ring.

10. A one-way clutch according to claim 7, further comprising a seal interposed between the end plate and one of said one end bearing and the outer ring to prevent the lube oil from leaking out of the oil-collecting pocket through a space, if any, between the end plate and a respective said one end bearing and outer ring.

11. A one-way clutch according to claim 7, wherein the end plate and one of said one end bearing and the outer ring are directly joined together to prevent the lube oil from leaking out of the oil-collecting pocket through a space, if any, between the end plate and a respective said one end bearing and outer ring.

12. A one-way clutch according to claim 7, further comprising a stop ring fixed on an inner circumferential wall of the outer ring with the radially outer circumferential portion of the end plate fixedly interposed between the stop ring and the outer wall of said one end bearing.

13. In a one-way clutch having an inner ring, an outer ring concentrically arranged in relation to the inner ring with an annular space defined therebetween, a clutch mechanism disposed in the annular space, and end bearings disposed adjacent opposite ends of the clutch mechanism, respectively, as viewed in the direction of a central axis of the inner ring so that the end bearings serve to guide the clutch mechanism, the improvement wherein:

an end plate is arranged on a side of an outer wall of each of the end bearings, said outer wall being opposite to an inner wall of the end plate located on a side of the clutch mechanism, the end plate comprises a substantially ring-shaped thin plate and is fixed with a radially outer circumferential portion thereof maintained in close contact with a corresponding end face of the outer ring or the outer wall of the associated end bearing, and a radially inner periphery of the end plate extends approximately to one of an area of sliding contact between the corresponding end bearing and the inner ring and beyond said area, whereby an oil-collecting pocket having an opening is defined between the end plate and a respective one of the associated end bearing and a corresponding end face of the inner ring;

wherein the end face of the inner ring is axially located between the end bearing and the end plate, and wherein the end bearing is provided with a helical oil groove formed in a wall thereof where the end bearing is maintained in sliding contact with the inner or outer ring, whereby a lube oil scattered under centrifugal force from a side of the inner ring is caught through the opening and is collected in the oil-collecting pocket and is guided by the helical oil groove into the clutch mechanism.

* * * * *